United States Patent
Kolch et al.

(10) Patent No.: US 10,377,644 B2
(45) Date of Patent: Aug. 13, 2019

(54) DEVICE AND USE THEREOF FOR THE UV TREATMENT OF FLUIDS

(71) Applicant: HYTECON AG, Lucerne (CH)

(72) Inventors: Andreas Kolch, Herford (DE); Dirk Paulsmeyer, Minden (DE); Hongbin Xu, Freiberg (DE)

(73) Assignee: Hytecon AG, Lucerne (CH)

( * ) Notice: Subject to any disclaimer, the term of this patent is extended or adjusted under 35 U.S.C. 154(b) by 154 days.

(21) Appl. No.: 15/526,576

(22) PCT Filed: May 5, 2016

(86) PCT No.: PCT/DE2016/100204
§ 371 (c)(1),
(2) Date: May 12, 2017

(87) PCT Pub. No.: WO2017/045662
PCT Pub. Date: Mar. 23, 2017

(65) Prior Publication Data
US 2017/0305762 A1    Oct. 26, 2017

(30) Foreign Application Priority Data
Sep. 17, 2015  (DE) .......................... 10 2015 115 713

(51) Int. Cl.
*C02F 1/42* (2006.01)
*C02F 1/32* (2006.01)
(Continued)

(52) U.S. Cl.
CPC .............. *C02F 1/325* (2013.01); *C02F 1/283* (2013.01); *C02F 1/42* (2013.01); *C02F 1/722* (2013.01);
(Continued)

(58) Field of Classification Search
CPC .......... A61L 2/14; H05H 1/2406; H05H 1/24; H01J 37/32825; H01J 37/32018;
(Continued)

(56) References Cited

U.S. PATENT DOCUMENTS 7,651,660 B2 *  1/2010  Kaiser ..................... A23L 3/28
                                                      210/319
8,674,322 B2 *  3/2014  Kohler .................... A61L 9/20
                                                      210/748.1
(Continued)

FOREIGN PATENT DOCUMENTS

CN       201362628 Y      12/2009
CN       102219289 A      10/2011
(Continued)

*Primary Examiner* — Walter D. Griffin
*Assistant Examiner* — Cameron J Allen
(74) *Attorney, Agent, or Firm* — Laurence A. Greenberg; Werner H. Stemer; Ralph E. Locher

(57) ABSTRACT

A device for the treatment of fluids has a flow-through housing, a cover, an inlet, a reactor chamber with inner walls, an outlet and UV LED radiation sources directed into the reactor chamber, and also a power supply. The device achieves a high purifying performance with less technical complexity and less installation space and needs only little electrical power. The interior of the reactor chamber has a flow-related design. The radiation sources are arranged in the fluid on or in an inner wall and a rotating fluid vortex is imparted to a fluid flowing through by the flow-related design. The radiation sources radiate radially from the outside inward and/or laterally onto the fluid vortex. At least a partial stream of the fluid in the fluid vortex passes a number of times by the radiation sources before leaving the reactor chamber.

18 Claims, 4 Drawing Sheets

(51) Int. Cl.
*C02F 1/28* (2006.01)
*C02F 1/72* (2006.01)
*C02F 1/78* (2006.01)

(52) U.S. Cl.
CPC .......... *C02F 1/78* (2013.01); *C02F 2201/009* (2013.01); *C02F 2201/326* (2013.01); *C02F 2201/328* (2013.01); *C02F 2201/3222* (2013.01); *C02F 2201/3227* (2013.01); *C02F 2201/3228* (2013.01); *C02F 2301/026* (2013.01); *C02F 2303/04* (2013.01); *C02F 2305/10* (2013.01); *C02F 2307/06* (2013.01); *Y02A 20/212* (2018.01)

(58) Field of Classification Search
CPC ............. H01J 37/32027; H01J 37/3244; H01J 2237/332; C23C 16/0272; C23C 16/26; C23C 16/45565; C23C 16/45578; C23C 16/4558; C23C 16/4585; C23C 16/4586; C23C 16/503; C23C 16/52
See application file for complete search history.

(56) References Cited

U.S. PATENT DOCUMENTS

| | | | |
|---|---|---|---|
| 2013/0323128 A1* | 12/2013 | Owen | A61L 9/205 422/121 |
| 2014/0030144 A1 | 1/2014 | Krosney et al. | |
| 2015/0158741 A1 | 6/2015 | Lee et al. | |
| 2015/0336810 A1* | 11/2015 | Smetona | C02F 1/008 210/96.1 |
| 2016/0075568 A1 | 3/2016 | Hansson et al. | |
| 2016/0122208 A1* | 5/2016 | Denkewicz | C02F 1/325 210/748.11 |

FOREIGN PATENT DOCUMENTS

| | | |
|---|---|---|
| EP | 2829518 A1 | 1/2015 |
| KR | 1020050111948 A | 11/2005 |
| KR | 1020130107221 A | 10/2013 |
| WO | 2014171886 A1 | 10/2014 |

* cited by examiner

DEVICE AND USE THEREOF FOR THE UV TREATMENT OF FLUIDS

BACKGROUND OF THE INVENTION

Field of the Invention

The invention relates to a device and the use thereof for the treatment of fluids, such as liquids or gases. The device includes a flow-through housing with a cover, an inlet, a reactor chamber with inner walls and an outlet, and with UV LED radiation sources directed into the reactor chamber, and also with a power supply therefor.

WO 2014 171 886 1 discloses a fluid purifying system that is based on radiation sources comprising UV LEDs, which however are arranged around a pipe, which entails the disadvantage that fluid flowing through the pipe can only flow once past each radiation source, even if the flow is made to be turbulent, so that a large number of radiation sources have to be arranged one behind the other and distributed on many sides around the circumference of the pipe to achieve a sufficiently great purifying effect.

SUMMARY OF THE INVENTION

The object of the invention is to provide a device and the use thereof for the treatment of fluids that achieve the same or an improved purifying performance with considerably less technical complexity and at the same time take up considerably less installation space and need reduced electrical power.

This object is achieved according to the invention by the features as outlined above together with the technical features as claimed. The device for the treatment of fluids, such as liquids or gases, consists in this case of a flow-through housing with a cover, an inlet, a reactor chamber with inner walls and an outlet, and also of UV LED radiation sources directed into the reactor chamber and with a corresponding power supply, the reactor chamber having an interior space and being provided with a flow-related design in such a way that a rotation can be imparted to a fluid flowing through it, so that the radiation sources that are arranged in the fluid at or in an inner wall or on the cover of the device are directed so as to radiate radially from the outside inward and/or laterally onto the fluid vortex and at least a partial stream of the fluid in the fluid vortex is made to pass a number of times close by the radiation sources, which are formed as highly efficient UV LEDs, before leaving the reactor chamber.

This advantageous design of the flow-through housing with the fluid vortex produced therein achieves a significantly increased dwell time in the reactor chamber in comparison with a through-flow time required in principle for a fluid from the inlet to the outlet, so that as a result a significantly increased UV dose can be applied to the individual constituent parts of the fluid.

The present construction therefore does not use the reflection of the UV radiation on the inner walls of the reactor as a decisive element of its function, the effect of which of course still exists and is also used in a structurally optimized manner, but rather aims in particular to transport the fluid as often as possible and as close as possible into the most effective irradiation zone in the reactor chamber, past the radiation sources as closely as possible, which is brought about easily and effectively by means of the rotating fluid vortex produced between the inlet and the outlet from the reactor chamber.

Further advantageous designs of the subject matter of the invention are obtained with the subsequent subclaims and in combination therewith.

According to a preferred embodiment of the invention, the flow-related design consists of internals arranged in the inlet and/or in the outlet in the form of fluid-directing surfaces, so that in the case of a construction of a 1st configurational variant in which the water, for example after entering from below, is guided initially through an angle of 90° horizontally along a lower inner wall and then upward on a vertical side wall, there along the underside of a cover and then further to the opposite side wall, from there downward and back horizontally, parallel to the deflected inlet direction of the fluid, where it mixes with newly added fluid, whereby a rotation of the fluid about a horizontal axis is enforced before the fluid can flow around on an edge of a fluid-directing surface arranged in the outlet through 180° counter to the tangential main direction of flow of the fluid vortex and can leave the reactor chamber at right angles to the inlet through the outlet.

In the case of a 2nd configurational variant with an approximately cylindrical reactor chamber and any desired outer form, for example a cylindrical or cubic outer form, of the flow-through housing, provided in the inlet are fluid-directing surfaces that make the fluid flow tangentially into the vicinity of the bottom, so that here too a rotation is again enforced, while in the outlet a fluid-directing surface formed as a pipe is arranged in the center of the reactor chamber, made to extend in the direction of the radiation sources and ends before them, through which pipe the fluid can flow away after multiple vortexing.

The reactor chamber of the device is in this case advantageously covered by a cover, which is arranged parallel or tangential to the circumferential surface of the fluid vortex laterally or from above on the flow-through housing, the radiation sources being fixed in the easily removable cover, whereby they are easily accessible and can be easily exchanged for maintenance purposes and/or can be cleaned. For this purpose, the sealing housing and the cover are advantageously formed with mating external and internal threads and also seals and sealing surfaces, so that they can be screwed to one another in a pressure-tight manner.

According to a particularly preferred design of the subject matter of the invention, some or multiple radiation sources are arranged on individual plug-in cards, which may for example be approximately the size of SD cards, slots that are equipped with contacts for supplying power to the radiation sources being provided for such plug-in cards in the cover and possibly additionally in the flow-through housing, so that an exchange or adaptation of the radiation sources with different performance data or wavelengths can be easily carried out.

Advantageously, at least the flow-related design features or other parts of the surface of the reactor chamber are made of aluminum, PTFE or titanium dioxide, or else are coated therewith, so that a photocatalytic self-cleaning can additionally take place in the reactor chamber, thereby obviating the need for frequent cleaning or allowing otherwise required cleaning intervals to be set further apart.

In the case of a further preferred embodiment of the invention, at least one measuring sensor for measuring fluid quality parameters is arranged in the reactor chamber, so that for example the disinfection values achieved can be read off and radiation sources can possibly be disconnected or connected, so that it is possible to react to the water quality supplied and also to make more cost-effective use of the energy to be used, without it being wasted ineffectively because of unnecessarily high radiation doses for clean fluids flowing through.

Furthermore, such measuring sensors may be advantageously interconnected with a computer-controlled domestic electrical and plumbing system, so that for example the UV radiation sources can be put into operation with or without active fluid through-flow and with constant, different or changing radiation performances, for instance in order to counteract specifically the growth of Legionella bacteria.

Particularly advantageously, the flow-through housing takes the external form of a cube or a cylinder, so that, to increase the performance in an easy way, multiple identical cubes or cylinders and/or, to enhance the fluid treatment, cubes or cylinders with other treatment elements, such as activated carbon, particle filters or ion exchangers, can be combined with one another to form cuboids or cylinders in series with one another of a greater length or height.

According to a particularly preferred design of the inventive device, it is arranged directly under or on a tabletop in front of or at an end-user point, for instance a drinking water removal point at the "point of use" (POU), that is to say at a faucet, or particularly preferably even as part of an outlet fitting, so that an end user can be sure that the water removed and freshly sterilized is quite safe to drink.

It is also advantageous that the device can have a connection for introducing hydrogen peroxide or ozone in order to be able to perform further treatment steps on the fluid flowing through.

In the case of an advantageous design of the invention, a solar cell is arranged on an upwardly and/or outwardly directed free surface of the flow-through housing or of the cover, so that the device works even without an external power supply, it being a further advantage that at least one electrical energy store for supplying energy to the radiation sources, by means of which the device can be kept operational even at night time, can be arranged in the flow-through housing and/or in the cover. An indicating device arranged in the flow-through housing and/or in the cover advantageously provides information concerning the operating state of the device for the user, whether for instance it is at the time being supplied with power externally or battery-operated or in what state of charge the batteries are in.

Altogether, the device described can be used to carry out an advantageous method for the treatment of fluids in which a vortexing motion is imparted to the fluid in the reactor chamber and the fluid is made to pass a number of times close by the radiation sources before it reaches the outlet, so that even a small number of powerful radiation sources are sufficient to allow for instance a desired quality of a disinfection to be achieved, for example largely killing off bacteria, viruses and parasites.

BRIEF DESCRIPTION OF THE SEVERAL VIEWS OF THE DRAWING

An exemplary embodiment of the invention is described in more detail below on the basis of a drawing, in which.

DESCRIPTION OF THE INVENTION

Figure 1:
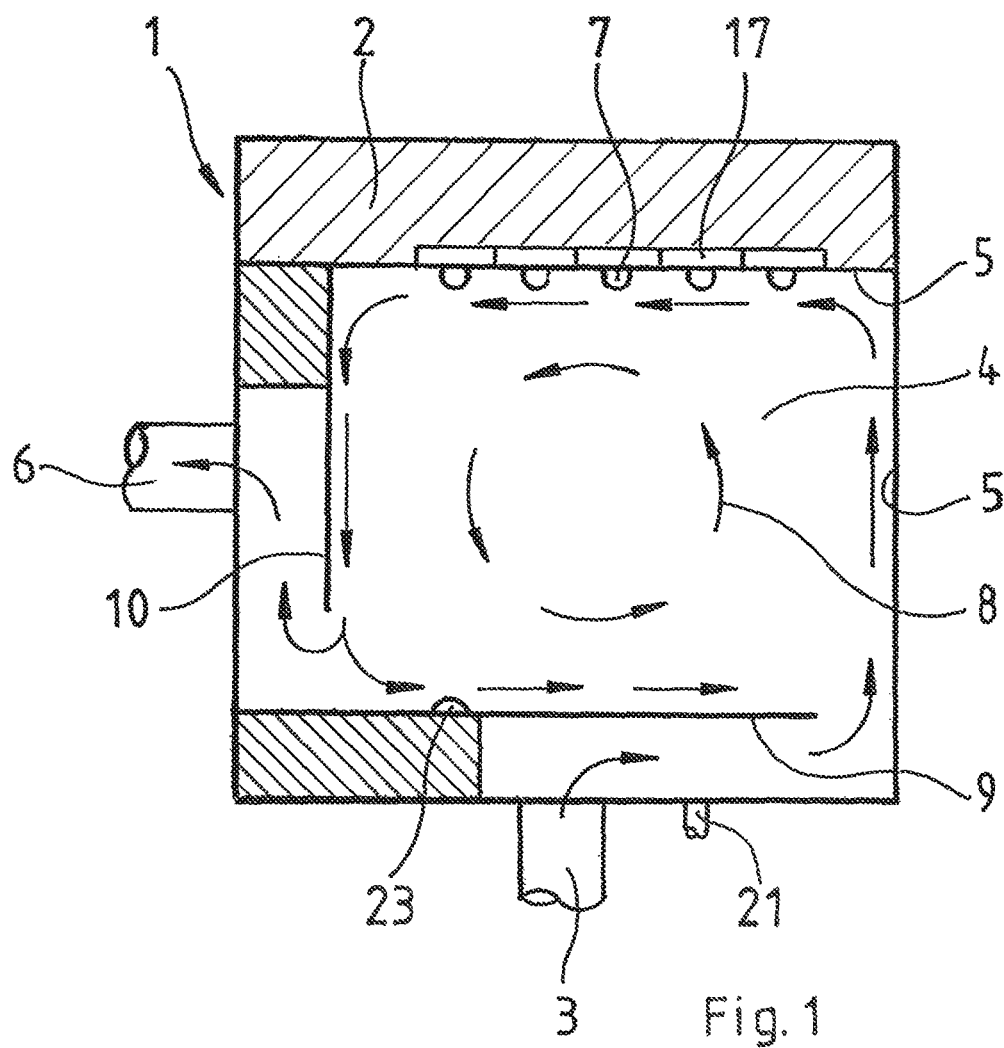
FIG. 1 shows a basic diagram of a 1st variant of the device in section.

The device shown for the treatment of fluids consists of a flow-through housing 1; 11, which is cubic or cylindrical here but may also be cuboidal or can be configured in any desired outer spatial form, with a cover 2; 12, and also with an inlet 3; 13 from below and, in the 1st variant, an outlet 6 angled away from the inlet through 90° or, in the 2nd variant, with a downwardly directed outlet 16 and inner walls 5; 15, there being arranged in the fluid UV LED radiation sources 7 that are in the cover 2; 12, directed inwardly into the reactor chamber 4; 14 and placed on plug-in cards 11, which are individually exchanged and only by way of example are of approximately the size of commonly used SD cards at 24×32×2 mm.

Behind the inlet 3; 13 and in front of the outlet 6; 16, the device is equipped with fluid-directing surfaces 9, 10; 19; 20, which in the reactor chamber 4 of the 1st variant produce a horizontally lying fluid vortex 8 and in the reactor chamber 14 of the 2nd variant produce a vertical fluid vortex 18, it being possible for the fluid itself to be liquid or gaseous and drinking water preferably being provided as the liquid; but other liquid foods, cosmetics or oil-containing media may also be treated, as well as gaseous fluids such as exhaust air, supply air or ambient air, which are in particular disinfected.

Figure 2:
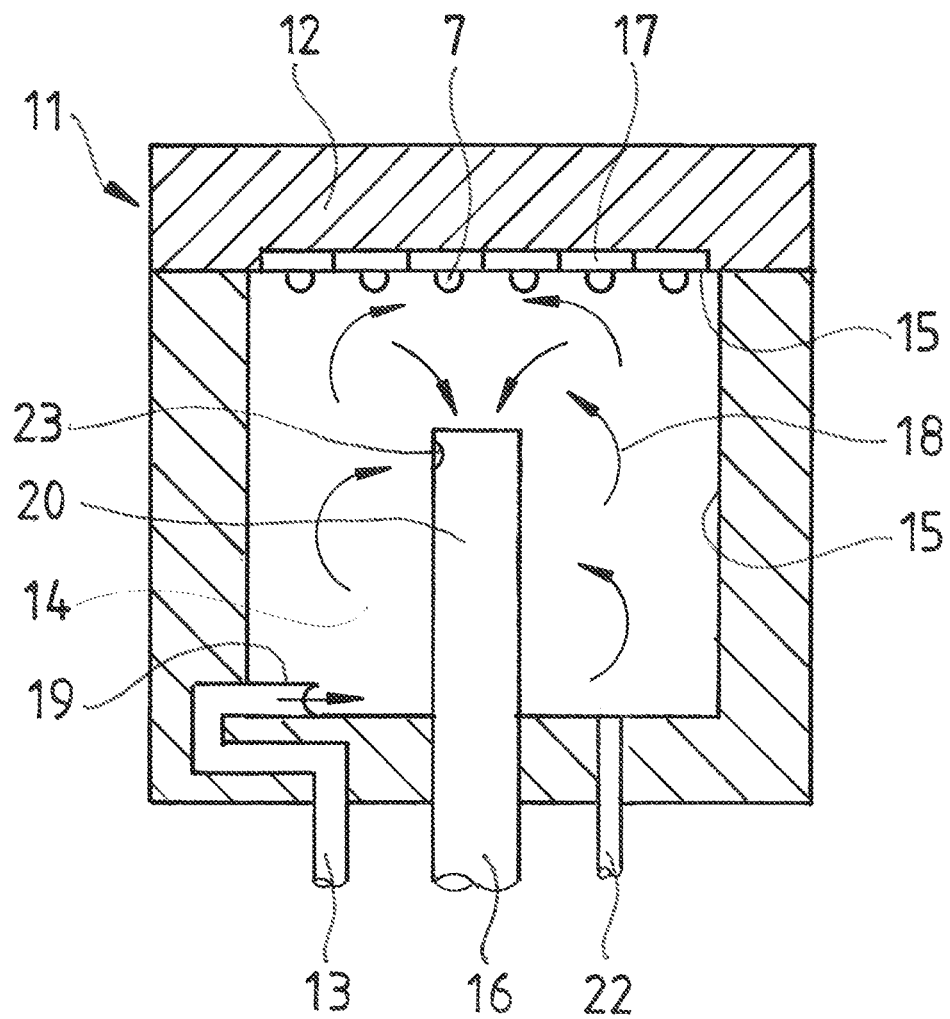
FIG. 2 shows a basic diagram of a 2nd variant of the device in section.

In the case of a vertically lying fluid vortex 8 of the 1st variant, shown in FIG. 1, with fluid removal transversely to its axis of rotation, it is similarly conceivable also to carry out a fluid removal coaxially in the direction of an axis of rotation of the fluid vortex 8, as shown for instance in FIG. 2 for the 2nd variant, the removal, as it is shown in FIG. 1, taking place over the fluid-directing surface 10 arranged in front of the outlet 6, from a part of the fluid vortex 8 that is flowing tangentially or parallel to the inner wall 5, and diverted therefrom through 180°, in order subsequently to be directed once again through 90° back into the outlet 6.

In the case of the cylindrical reactor chamber 14 of the 2nd variant, the fluid is fed in tangentially over a fluid-directing surface 19 in the region of the bottom and a vertical fluid vortex 18 is produced, this vortexes about a tubular fluid-directing plate 20 arranged axially in the center of the fluid vortex and directs the fluid first in the upper region, there through into the outflow 16, before however it is made to pass a number of times under the UV radiation sources in the cover 12, which are placed directly in the fluid and radiate at the end faces into the reactor chamber 14. Here, too, it is alternatively or additionally possible to use UV radiation sources radiating radially or else from the opposite end face, which however are not shown in the drawings.

The flow-related design features in the form of fluid-directing surfaces 9; 10; 19; 20 may in this case be designed as simple inserts in the flow-through housing 1; 11 configured as a cube or cylinder, which consist of aluminum, PTFE or titanium dioxide, or else are coated therewith.

Figure 4:
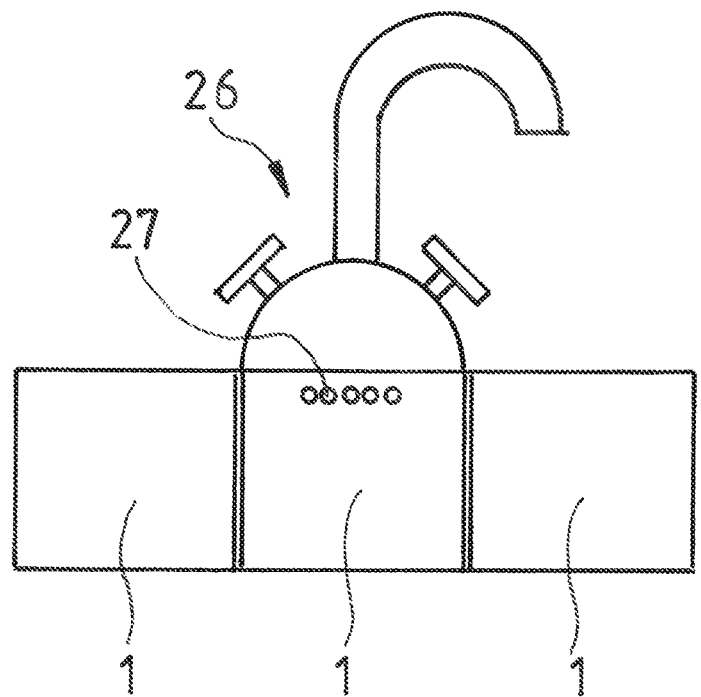
FIG. 4 shows a basic diagram of the device integrated in an outlet fitting.
Figure 5:
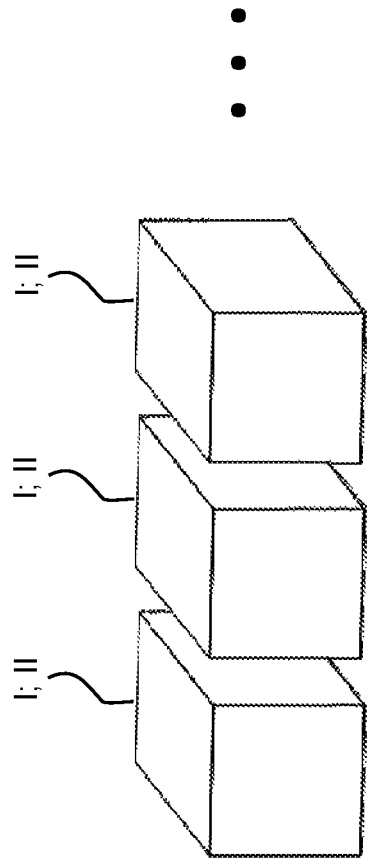
FIG. 5 shows an embodiment of the invention with a plurality flow through housings taking the form of cubes and cylinders that are disposed in series with one another.
Figure 5:
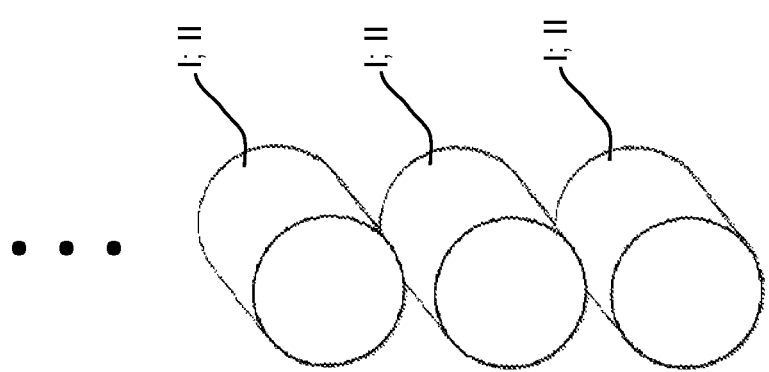

The 90° arrangement of the inlet 3 and the outlet 4 for the fluid of the flow-through housing 1 of the 1st variant allows multiple cubes to be combined with one another, for instance in order to increase the amount of fluid to be treated and/or in order to combine different treatment steps, it being possible for example for cubes with activated carbon or particle filters to be connected one behind the other in series, as shown in FIG. 4. The flow-through housing 1 of the inventive device then forms a main cube, which is equipped with a power supply, to which there may be connected further cubes, which do not require a power connection of their own.

Similarly, multiple active flow-through housings 1; 11 can be arranged one behind the other or one next to the other, those of the 2nd variant having cylindrical reactor chambers 14 but likewise being able to have cuboidal outer dimensions and therein correspondingly guided inlets 13 and outlets 16, so that the flow-through housings 11 of the 2nd variant can also be put together with one another or with other flow-through housings of supplementary treatment steps.

Figure 3:
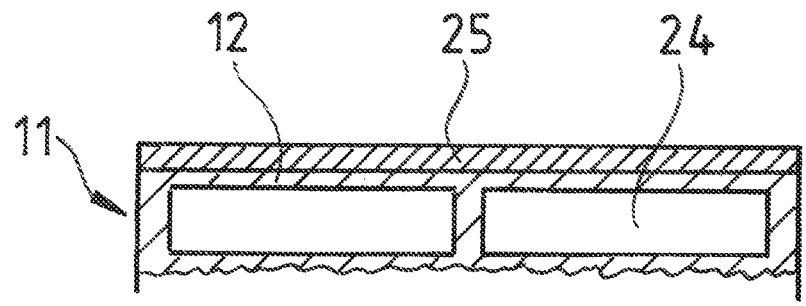
FIG. 3 shows a basic diagram of the device with a solar cell and a rechargeable battery in a partial section.

As shown in FIG. 3, the cover 2; 12 of a flow-through housing 1; 11 is provided on an upwardly directed free surface with a solar cell 25, and similarly electrical energy stores for supplying energy to the radiation sources 7 are arranged in the cover 2; 12.

FIG. 4 shows a combination of three flow-through housings 1; 11 to be arranged above a tabletop with an indicating device 27 for the operating state of the device arranged in a flow-through housing 1; 11.

The invention claimed is:

1. A device for treating fluids, the device comprising:
 a flow-through housing with a cover, an inlet, a reactor chamber with inner walls and an outlet;
 ultra-violet light emitting device (UV LED) radiation sources directed into said reactor chamber and a power supply for said radiation sources;
 said reactor chamber defining a free interior space and having inner walls surrounding said interior space and having a flow-related design configured to impart a rotating fluid vortex to a fluid flowing therethrough;
 radiation sources arranged in the fluid on or in an inner wall and directed to radiate radially from the outside inward and/or laterally onto the fluid vortex, and wherein at least a partial stream of the fluid in the fluid vortex passes by said radiation sources a plurality of times before leaving said reactor chamber via said outlet; and
 wherein one or more radiation sources are arranged on individual plug-in cards, said flow-through housing and/or said cover are formed with slots for receiving said plug-in cards, and said slots contain contacts for supplying power to said radiation sources.

2. The device according to claim 1, wherein said flow-related design comprises fluid-guiding surfaces in at least one of said inlet or said outlet.

3. The device according to claim 1, wherein said cover is formed to cover said reactor chamber said cover is arranged parallel or tangential to a circumferential surface of the fluid vortex on or against said flow-through housing, and said radiation sources are fixed on or in said cover, and said cover forms partial surfaces of said inner walls.

4. The device according to claim 1, wherein said flow-through housing is a sealed housing, and wherein said housing and said cover have mating external and internal threads and also seals and sealing surfaces, and said housing and said cover are screwed to one another in a pressure-tight and liquid-tight manner.

5. The device according to claim 1, wherein said flow-related design features or parts of a surface of said reactor chamber are coated with, or consist of, a material selected form the group consisting of aluminum, polytetrafluoroethylene (PTFE) and titanium dioxide and said material produce an ongoing photocatalytic self-cleaning during operation.

6. The device according to claim 1, which comprises measuring sensors for measuring liquid quality parameters disposed in said reactor chamber.

7. The device according to claim 6, wherein said measuring sensors are connected to a computer-controlled domestic electrical and plumbing system and said UV radiation sources are selectively operated by said computer-controlled domestic electrical and plumbing system.

8. The device according to claim 7, wherein said UV radiation sources are selectively operated with or without active fluid through-flow and with constant, different or changing radiation intensities.

9. The device according to claim 1, wherein said flow-through housing has an exterior shape selected from the group consisting of a cube and a cylinder.

10. The device according to claim 1, wherein said flow-through housing comprises a plurality of identical cubes or cylinders.

11. The device according to claim 1, wherein said flow-through housing comprises a plurality of cubes or cylinders combined with treatment elements selected from the group consisting of activated carbon, particle filters and ion exchangers, and forming cuboids or cylinders of an increased length/height.

12. The device according to claim 1, wherein said flow-through housing is disposed under or on a tabletop directly at an end-user point such as a drinking water removal point at a "point of use" or forms a part of an outlet fitting.

13. The device according to claim 1, which comprises a connection for introducing fluid treating substances into said reactor chamber.

14. The device according to claim 13, wherein the fluid treating substances to be supplied through said connection are selected from the group consisting of hydrogen peroxide and ozone.

15. The device according to claim 1, which further comprises a solar cell disposed on an upwardly and/or outwardly directed free surface of said flow-through housing or said cover.

16. The device according to claim 1, wherein at least one electrical energy storage device for supplying energy to said radiation sources is arranged in said flow-through housing or in said cover.

17. The device according to claim 1, which further comprises indicating devices for displaying an operating state of the device disposed in said flow-through housing and/or in said cover.

18. A method of treating a fluid, the method comprising:
 providing a device according to claim 1;
 introducing the fluid into the reactor chamber and imparting a vortexing motion to the fluid in the reactor chamber; and
 causing at least a partial amount of the fluid to pass a plurality of times in a vicinity of the radiation sources before the fluid reaches the outlet.

* * * * *